Figure 1:
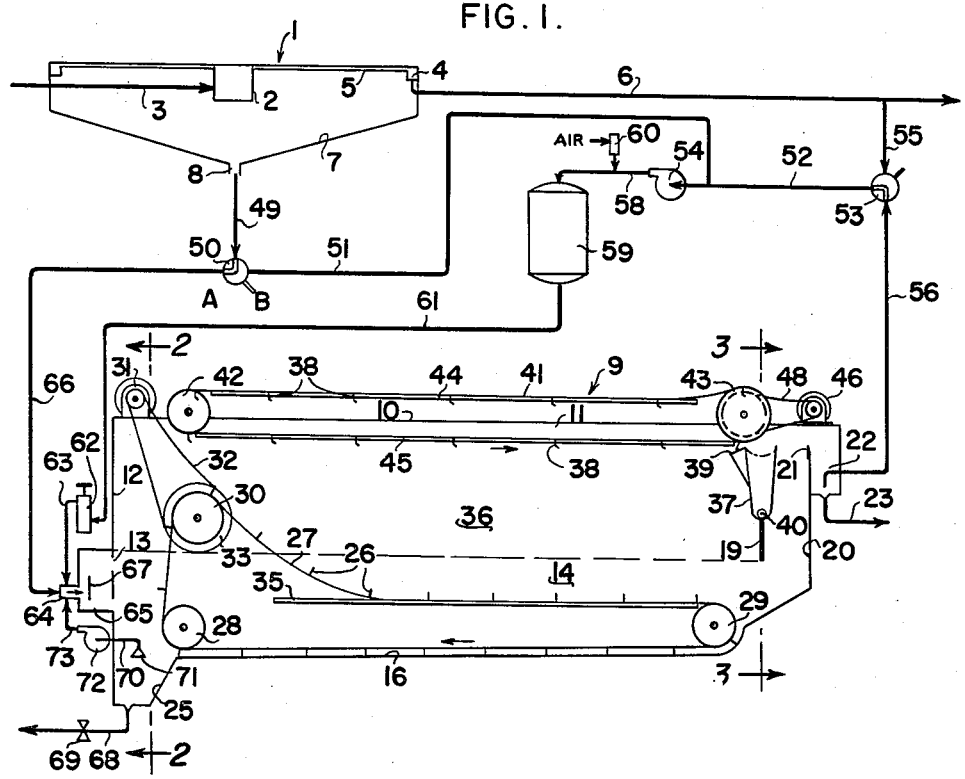

Nov. 13, 1962

W. J. KATZ 3,063,938

METHOD AND APPARATUS FOR THICKENING

Filed Jan. 28, 1960

INVENTOR.
WILLIAM J. KATZ
BY
*Ernst W. Schultz*
ATTORNEY

3,063,938
Patented Nov. 13, 1962

3,063,938
METHOD AND APPARATUS FOR THICKENING
William J. Katz, Fox Point, Wis., assignor to Chain Belt Company, Milwaukee, Wis., a corporation of Wisconsin
Filed Jan. 28, 1960, Ser. No. 5,166
7 Claims. (Cl. 210—44)

This invention relates to a method and apparatus for thickening or dewatering of suspended solids such as activated sewage sludge having a very low gravity-separation rate and particularly includes an improved method of thickening such suspended solids by the use of dissolved air. This application is a continuation in part of the application of William J. Katz, Serial No. 831,126 filed August 3, 1959 and entitled Apparatus for and Improved Method of Thickening.

According to the present invention, the apparatus includes a tank having a relatively deep, upper quiescent zone and a lower recirculation zone into which the raw flow is introduced with a larger quantity of clear water provided with the air for flotation. The air is first dissolved in the clear water under pressure and in suddenly releasing such pressure, some of the air is caused to come out of solution in the form of finely divided bubbles. The water and the air bubbles are introduced into the tank with the raw flow. As the flow moves through the lower recirculation zone of the tank, the solids are lifted out of the flow by the air bubbles adhering thereto. The floating solids develop an air-charged blanket at the water surface of the quiescent zone supporting a top layer of solids above the water surface having the desired maximum solids concentration. The concentration referred to occurs only in the uppermost part of the blanket and its removal provides the thickener with a high operating efficiency.

The large amount of clear water used is in the order of two and three times that of the flow itself in order to supply the blanket formed in the quiescent zone with the necessary air. Such air must, however, comprise air bubbles of a minimum size which will remain intact in the blanket and support the top layer of thickened solids above the normal water level. It is also essential that the top layer be supported at least some distance above the water level of the tank so that the water is, in effect, allowed to drain therefrom.

The clear water may be variously supplied. The most convenient supply is generally from the effluent of the thickening unit itself, and is also referred to as the "recycle." It is also possible to add the clear water to the raw flow and dissolve the air therein while under pressure so that the air bubbles are formed as the mixture is passed through a pressure-reducing valve. However, the present invention is intended particularly for the dewatering of primary and/or activated sewage sludges which are not readily passed through a reducing valve without breaking up the sludge particles. A further advantage in forming the air bubbles only in the clear water resides in the fact that only the clear water then circulates through the pump and reducing valve, and fouling and frequent cleaning of these parts and of the gas contact chamber is avoided.

The supply of air required to establish and maintain the air-charged blanket is based on the discovery that within certain limits, the dilution of the raw flow effected by the clear water providing the vehicle for the required air actually promotes the separation of the solids from the flow and makes possible the supply of air necessary to the support of the sludge in the blanket. Accordingly, the clear water or recycle providing the vehicle for the air used for flotation is also referred to hereinafter as a diluent.

A principal object of the invention is to provide apparatus for the efficient thickening or dewatering of raw waste which may include either or both primary or activated sewage sludge or other suspended solids.

Another object is to provide apparatus with a low detention time for low cost and efficient operation.

Another object is to provide apparatus and a method for separating both settable and floatable solids at considerably higher rates as in conjunction with a conventional sewage treatment plant.

Another object of the invention is to provide the thickening of untreated or activated sewage sludge or both at high rates providing the necessary solids concentration and an effluent which can be alternatively returned to the primary treatment tank when operating at maximum rates or added to the primary tank effluent when operating at lower rates. This allows the rate of operation of the thickener to be considerably varied and to correspond with the large fluctuations which occur from time to time in the flow through the plant.

Another object of the invention is to provide apparatus for the efficient thickening of the sludge at low cost and of flexible operation so that a single unit may be used in connection with a number of primary settling tanks operating in parallel at peak loads and separately thereof at normal and less than normal loads.

Another object is to provide apparatus having a particle holding time of as little as two hours and providing the desired dewatering of the larger part of the sludge to be carried out with the separated water.

The drawings furnished herewith illustrate the best mode of carrying out the invention as presently contemplated and set forth hereinafter.

Figures 2, 3:
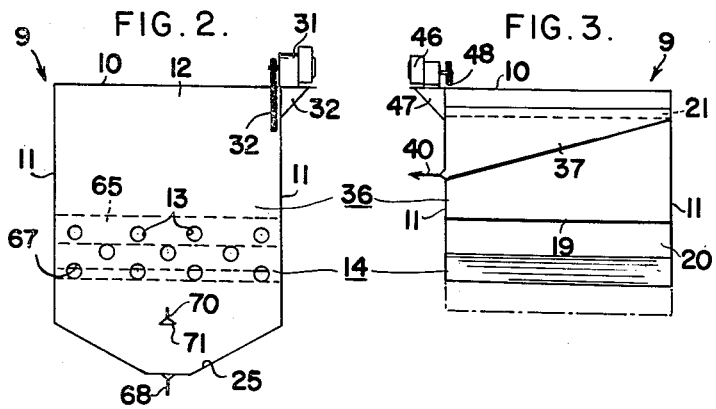

In the drawings:

FIGURE 1 is a vertical sectional view of a gravity-settling tank connected for operation with the thickening tank embodying the invention. The settling tank as shown is smaller than the thickening tank embodying the invention. It should be understood that in practice the gravity-settling tank would be up to ten times larger than the thickening tank;

FIGURE 2 is a vertical sectional view taken on line 2—2 of FIG. 1 showing the influent end of the thickening tank; and FIG. 3 is a vertical sectional view taken on line 3—3 of FIG. 1 showing the effluent end of the tank;

The gravity settling tank 1 shown in FIGURE 1 only of the drawings includes the central feed-well 2 for receiving the raw flow from the delivery pipe 3 connected thereto. The effluent launder 4 having an overflow weir 5 extending around the periphery of tank 1 is connected to the discharge pipe 6. Tank 1 also includes suitable means, not shown, for moving the sludge which settles by gravity on the bottom 7 of the tank to the central outlet 8 of the tank.

The thickening unit 9 shown in larger scale in the drawings includes the tank 10 having side walls 11 and the influent end 12 provided with the ports 13 which open into the lower zone 14 of the tank. Recirculation zone 14 extends along the floor 16 of tank 10 to below the vertical baffle 19 spaced from the wall 20 forming the effluent end of the tank. The clear water from zone 14 flows upwardly between baffle 19 and wall 20 to the adjustable overflow weir 21 which determines the normal water level within the tank. The well 22 on the outside of wall 20 of the tank receives the water flowing over weir 21 and is provided with the discharge pipe 23 for return to tank 1 or storage or other treatment means, not shown, and depending upon the general application of the present invention.

The floor 16 of tank 10 slopes from the effluent end of the tank downwardly slightly to the sump 25 extending across the bottom of the tank at the influent end thereof. Sump 25 is disposed to receive the settleable material and any grit which settles out from zone 14 of the tank. The settled material and grit is collected or pushed to the sump by the series of scrapers 26 which are carried and driven by parallel chains operated over corresponding sprockets within the tank. The parallel chains referred to include the chain 27 shown diagrammatically in FIG. 1 and operating over the sprockets 28 and 29 respectively disposed near the influent and effluent ends of the tank, and the drive sprocket 30 located above sprocket 28. The motor and gear reduction unit 31 supported on the bracket 32 above the tank is connected by chain 32 with sprocket 33 to drive sprocket 30 and operate the scrapers 26. The lower run of chain 27 pulls scrapers 26 over floor 16 of tank 11 and the return run of the chains from drive sprocket 30 to sprocket 29 is supported by the rail 35 fixed to a side wall 11 of the tank.

The upper zone 36 of the tank extends from influent end 12 to the trough 37 and baffle 19 and has a given detention time as will be described for the compaction of the floating material to form an upper layer of a maximum solids concentration at and above the liquid level maintained within the tank by weir 21. The upper layer of floating material referred to, and as will be more fully described, is collected by the series of flights 38 which push the material toward and over the beach 39 into trough 37. Various collecting means may be provided in trough 37 or, as shown, the trough may be provided with a bottom which slopes toward one wall of the tank for discharge through the line 40.

Flights 38 are carried and driven by spaced parallel chains which include the chain 41 shown diagrammatically and which operates over the sprockets 42 and 43. The chain is supported therebetween by the upper and lower rails 44 and 45 respectively. The motor drive unit 46 is supported at the effluent end of the tank on the bracket 47 and by means of the chain drive 48 operates the flights 38 to push the upper layer of the floating material towards and over the beach 39.

The pipe 49 connects the sludge outlet 8 of the tank 1 with the valve 50 which in the position (not shown) represented by the letter "A" connects pipe 49 with the pipe 51. Pipe 51 opens into the delivery line 52 connecting valve 53 with the pump 54.

Valve 53 is connected to pipe 6 by line 55 and is also connected to the line 56 extending into well 22 of tank 10 to provide the delivery of the diluent to pump 54 from either pipe 6 or well 22. The source of the diluent is largely a matter of convenience and generally would be taken from tank 10, as described hereinafter, for delivery under pressure by pump 54 through the line 58 to the tank 59. The air compressor 60 shown diagrammatically is connected to line 58 to inject air under pressure into the liquid delivered to tank 59 under pressure. For maximum absorption of the air supplied by compressor 60, the tank 59 should include suitable means providing a large area of contact between the air and water.

The discharge line 61 from tank 59 is connected to the high-pressure side of pressure reducing valve 62. The line 63 from the low-pressure side of the valve is connected to the mixing box 64 which opens into the distribution manifold 65. Valve 62 is located near box 64 and provides the sudden pressure reduction of the air-charged stream from tank 59. With valve 50 in the position represented by the letter "A," the sludge from tank 1 is first diluted in line 52 and the air bubbles are formed in the mixture upon passing through valve 62. With valve 50 in the "B" position, only the diluent is charged with the air and the sludge is delivered from pipe 49 through valve 50 to the line 66 connected to box 64. The streams are mixed in box 64 and pass around baffle 67 for distribution in manifold 65 which extends the width of the tank 10 and opens into the lower zone 14 through the ports 13 in wall 12 previously described.

The heavy sludge and grit collected in sump 25 is periodically removed by the line 68 connected to the bottom of the sump and controlled by the valve 69. The lighter sludges collected in sump 25 are withdrawn from the sump through the line 70 having its inlet 71 spaced from the bottom of the sump and connected to the inlet of pump 72, shown diagrammatically. The line 73 from the discharge end of pump 72 opens into box 64 to add the sludge to the sludge received directly from tank 1 through line 66.

In the operation of thickener 9 in conjunction with tank 1, the pressure-reducing valve 62 provides the discharge of the water carrying the dissolved air so that the sudden reduction in pressure causes a part of the air to come out of solution in the form of minute, small bubbles, preferably up to or smaller than 100 microns in diameter.

The sludge delivered to box 64 mixes with the water and air bubbles formed therein so that the air bubbles adhere to the sludge particles to form small buoyant structures which are discharged into the lower recirculation zone 14 of the tank.

As the combined flow moves toward the effluent end of the tank, the buoyant structures comprising the solid particles and adsorbed air float upwardly out of the zone 14 and into the upper quiescent zone 36 of tank 10, and after an initial period of operation, a buoyant air-charged blanket is developed in zone 36 extending above and below the water level of the tank as established by weir 21. This blanket may extend several inches above the water level and from 9 to 24 inches or more below the water level.

According to the invention, a velocity of flow through separation zone 14 of as high as four feet per minute may be allowed to provide the supply of air in the form required, this velocity being made possible by the effect which the dilution referred to has upon the separation rate of the solids with adsorbed air. However, it should be noted that this effect appears only within a range of dilution or rate of recycle as shown by the following tabulation.

The following tabulation is based on results observed using activated sewage sludge having a solids concentration of 0.91% by weight and using the plant effluent for the dilution and the vehicle for the air-bubbles. The air bubbles were obtained by saturating the liquid at about 30 p.s.i.g. and releasing the same to atmospheric pressure.

| Rate of Dilution | Solids Concent. (diluted), percent | Water Content. (diluted), percent | Rate of Rise (Feet) per minute) | Efficiency[1] |
|---|---|---|---|---|
| 0 | 0.91 | 99.09 | [2] 0.175 | 0.175 |
| 1 | 0.455 | 99.545 | 0.30 | 0.15 |
| 2 | 0.30 | 99.70 | 1.20 | 0.40 |
| 3 | 0.23 | 99.77 | 1.80 | 0.45 |

[1] Relative, equals rate of rise/total volume.
[2] Total pressurization.

The above tabulation shows that with an increase in the dilution or recycle, there is a normal, corresponding increase in the rate of rise of the solid particles supported by the air bubbles, but if this dilution or rate of recycle is further increased within limits, the increase in the rate of rise is greater than should be expected and sufficiently greater than the accompanying increase in volume, so that the efficiency effected makes possible the increased use of clear water as the vehicle for the introduction of air in the quantities and form required to establish and maintain the air-charged blanket.

The air blanket is maintained by the addition of air in the quantity required and is accomplished by (a) diluting the raw flow with an air-charged flow of several times the raw flow and (b) passing the combined flows beneath the air blanket at the maximum rate allowed by the fast rate of rise which the dilution makes possible, and (c) removing the top layer of the air-charged blanket while leaving the remaining portion of the blanket which thereafter forms the upper layer.

The recirculating zone is limited to the lower one-third of the tank. (This figure is not to be considered precise, but is typical). As such, the high velocity in the recirculation zone tends to and may drive the air-charged blanket toward the effluent end of the tank. In such cases, the flights for removal of the thickened solids might better be operated in the direction of the influent end of the tank. This is mentioned particularly to distinguish the present invention from the ordinary air-flotation system which is intended to separate the suspended solids from the liquid and operates with as little recycle or diluent as possible.

The invention is for example, intended for thickening sludges having a solids concentration of less than 1% by diluting the same to between ½% and ¼% in concentration to enable thickening to a 6% concentration or higher. A typical rate of solids removal would be 15 pounds of dry solids per square foot per day.

Various modes of carrying out the invention are contemplated as within the scope of the following claims particularly pointing out and distinctly claiming the subject matter which is regarded as the invention.

I claim:

1. The method of thickening light sludges such as a sewage plant sludge which method comprises first diluting and thoroughly mixing the sludge with relatively clear water having finely divided air bubbles of up to about 100 microns in diameter entrained in said water and in the ratio of at least one part of clear water to one part of sludge so that the sludge particles are fully separated to allow the air bubbles to surround the particles and adhere thereto without agglomerating, introducing said dilution into the lower portion of a tank to flow beneath a quiescent zone of two feet or more in depth comprising the upper part of the tank and at a rate through said lower portion allowing the air-supported particles and excess bubbles to rise unhindered by reason of said dilution into the quiescent zone and to distribute themselves over the lower area thereof, and to thereby develop a buoyant scum blanket having a uniformly increasing concentration gradient approaching the upper layer thereof and having a minimum depth of one foot below the water level of the tank, and maintaining said conditions to develop and thereafter provide a continuously removable scum layer above said water level having a solids concentration in the order of four percent and over and at a rate for such removal of ten or more pounds of dry solids per square foot per day, and regularly removing said removable scum layer so that said concentration gradient is continuously maintained.

2. The method of claim 1 wherein the sludge having a solids concentration in the order of one percent is mixed with said relatively clear water in proportions to lower the solid concentration of the sludge to between one-quarter and one-half percent before introducing the dilution into the tank for thickening.

3. The method of thickening by air flotation as applied to a settled sewage plant sludge or the like having a concentration of between one-half and one and one-half percent which method includes rediluting said sludge simultaneously with the introduction of the flotation air by thoroughly mixing with each one part of said sludge one part of relatively clear water having air bubbles of not over about one hundred microns in size entrained in said water for every one-half percent solids concentration of said sludge, said dilution and mixing serving to separate the solid particles simultaneously with the introduction of the air bubbles therebetween whereby the individual particles are more fully surrounded by attached bubbles and have a rate of rise in the order of one foot per second or more, thereafter passing said mixture beneath a quiescent flotation zone at a velocity which allows the suspended solids in the sludge to be lifted upwardly into said zone and at a rate so that said zone receives in excess of ten pounds of dry solids per square foot per day, maintaining said flow to develop a buoyant sludge blanket of substantial depth in the order of nine inches to two feet, and while maintaining said blanket removing the upper portion thereof continuously or regularly to provide a concentration which is at least several times the concentration of the settled sludge.

4. The improved air flotation method of thickening a settled sewage plant sludge or the like having a solids concentration which may vary between one-half and one and one-half percent which method comprises first rediluting such settled sludge simultaneously with the introduction of the floation air by thoroughly mixing with one part of said sludge relatively clear water having the flotation air in the form of air bubbles of not over about one hundred microns in size entrained in said water and in the ratio of one part of water for every one-half percent of solids concentration of the sludge, said dilution and mixing providing the uniform and consistent separation of the solid particles simultaneously with the introduction of the air bubbles therebetween whereby the individual particles are fully surrounded by bubbles adhering thereto prior to their introduction into the tank, and passing said mixture beneath the quiescent flotation zone of a tank at a rate which allows the suspended solids in the sludge to be lifted upwardly into said zone at the high rate of rise provided by said redilution, maintaining said flow to develop a buoyant sludge blanket of substantial depth in the tank, and while maintaining said blanket removing the upper portion thereof continuously or regularly to provide a sludge which is consistently thickened sludge to a concentration of four percent or more.

5. Apparatus for thickening a sewage plant sludge or the like comprising a tank having an upper quiescent zone of at least two feet in depth throughout and a lower flow-through zone, said tank having distribution means at one end of said lower zone and an outlet at the other end of said lower zone with means to maintain a given liquid level in the upper zone of the tank, said distribution means and outlet being disposed beneath said quiescent zone to maintain a horizontal hydraulic interface between said zones, means for the supply of relatively clear water having air bubbles entrained therein of not over about one hundred microns in diameter and including a mixing chamber to receive said sludge and said air-charged water in the ratio of between two and four volumes of said water with each volume of sludge and to mix the same, a conduit connecting said chamber with said distribution means for introduction of said mixture into the tank, and collector means operating over said quiescent zone to remove the upper layer of the scum blanket developed in said upper zone as said particles are delivered to said quiescent zone through said interface.

6. Apparatus for thickening a sewage plant sludge or the like comprising means supplying relatively clear water having finely divided air bubbles entrained therein, a mixing chamber to receive said sludge and clear water with entrained air and mix the same in the ratio of one part sludge to between two and four parts of water and which is sufficient to separate the particles so that their rate of rise with attached air bubbles is in the range of one foot per minute, a tank having an upper quiescent zone and a lower flow-through zone, said tank having distribution means at one end of said lower zone to introduce and direct the flow through said lower zone toward the opposite end of the tank, said opposite end of the tank having an outlet for said lower zone and including overflow means which maintains a given liquid level of the upper quiescent zone of the tank, each zone being of about two feet or more in depth and having a horizontal hydraulic interface therebetween, means for delivering said mixture to said distribution means, and collector means operating over the tank at said liquid level to remove the uppermost layer of said scum blanket which is formed in said quiescent zone extending downward to said hydraulic interface and at the rate at which the particles are delivered to the underside of said quiescent zone through said interface.

7. The invention of claim 6 wherein the upper and lower zones of the tank are each at least two feet in depth whereby a scum blanket of nine inches to two feet in depth may be maintained in the upper zone and the lower zone provides an adequate passageway for the supply of the mixture fed to the tank to the entire area of the upper zone at the rate of rise indicated.

References Cited in the file of this patent

UNITED STATES PATENTS 2,334,703     Henkel                Nov. 23, 1943

OTHER REFERENCES

Chain Belt "Float-Treat System" Bulletin 54–82, published by Chain Belt Company, Milwaukee, Wisconsin, prior to October 1957.